United States Patent
Skotnicki et al.

(10) Patent No.: US 9,303,630 B2
(45) Date of Patent: Apr. 5, 2016

(54) DEVICE FOR CONVERTING THERMAL ENERGY INTO ELECTRIC ENERGY IN THE PRESENCE OF A HOT SOURCE

(71) Applicant: STMicroelectronics (Crolles 2) SAS, Crolles (FR)

(72) Inventors: Thomas Skotnicki, Crolles-Monfort (FR); Onoriu Puscasu, Grenoble (FR); Stéphane Monfray, Eybens (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 518 days.

(21) Appl. No.: 13/874,163

(22) Filed: Apr. 30, 2013

(65) Prior Publication Data

US 2013/0292952 A1 Nov. 7, 2013

(30) Foreign Application Priority Data

May 3, 2012 (FR) ...................................... 12 54054

(51) Int. Cl.
| | |
|---|---|
| H02N 10/00 | (2006.01) |
| H01H 9/28 | (2006.01) |
| F03G 7/06 | (2006.01) |
| H02N 1/08 | (2006.01) |

(52) U.S. Cl.
CPC ... *F03G 7/06* (2013.01); *H02N 1/08* (2013.01)

(58) Field of Classification Search
CPC ..... F03G 7/06; H01H 2061/006; H01F 38/12; A61N 1/32; H02B 7/08
USPC ............................ 310/307; 361/268; 290/1 R
See application file for complete search history.

(56) References Cited

U.S. PATENT DOCUMENTS

| 4,054,826 A | 10/1977 | Wahlstrom |
| 6,978,611 B1 | 12/2005 | Landis |
| 8,325,463 B2 * | 12/2012 | Peterson .................. H01G 7/04 320/166 |
| 2006/0113862 A1 | 6/2006 | Suzuki et al. |
| 2011/0115237 A1 | 5/2011 | Skotnicki |
| 2014/0009035 A1 * | 1/2014 | Toyoda .................... H01G 5/16 310/330 |

FOREIGN PATENT DOCUMENTS

| DE | 1 184 828 | 1/1965 |
| JP | 2002144297 A | 5/2002 |

OTHER PUBLICATIONS

Search Report and Written Opinion dated Jan. 16, 2013 from corresponding French Application No. 12/54054.

*Primary Examiner* — Thomas Dougherty
(74) *Attorney, Agent, or Firm* — Seed IP Law Group PLLC

(57) ABSTRACT

A device for converting thermal energy into electric energy intended to be used in combination with a hot source including: a capacitor of variable capacitance, including two electrodes separated by an electrically-insulating material, one of these electrodes being deformable and being associated with an element forming a bimetallic strip, said bimetallic strip including at least two layers of materials having different thermal expansion coefficients, said bimetallic strip being free to deform when it is submitted to the heat of said hot source; a second capacitor having a first electrode connected to a first electrode of said capacitor of variable capacitance; a harvesting circuit electrically connected between the second electrode of the capacitor of variable capacitance and the second electrode of the second capacitor, said harvesting circuit being capable of conducting the current flowing between said second electrodes.

22 Claims, 4 Drawing Sheets

DEVICE FOR CONVERTING THERMAL ENERGY INTO ELECTRIC ENERGY IN THE PRESENCE OF A HOT SOURCE

CROSS REFERENCE TO RELATED APPLICATIONS

This application claims the priority benefit of French patent application serial number 12/54054, filed on May 3, 2012, which is hereby incorporated by reference to the maximum extent allowable by law.

BACKGROUND

1. Technical Field

The present disclosure relates to energy conversion devices especially enabling to convert thermal energy into electric signals to store this energy in electric form.

The present disclosure especially, but not exclusively, applies in the field of self-contained sensors, which are electronic devices intended to be used in locations where a simple connection to the electric supply network is not possible, or in locations where other energy sources such as solar energy have a low or no efficiency. The heat sources supplying the devices described in this embodiment may have a natural or artificial origin (fluid channeling, electronic components, Joule effect heat flow).

2. Discussion of the Related Art

The development of low-consumption electronic components, due to the miniaturization of integrated circuits, to the improvements associated with the energies require to operate them, and the widespread use of MEMS (microelectromechanical systems), inspires many developments in the exploitation of vibratory, solar, thermal, and other energies.

Many heat sources dissipate thermal energy which remains unexploited. At the same time, in certain locations of difficult access, it may be hard work or expensive to provide an electric power supply from the public distribution network or to have to perform a specific maintenance for manually recharging a battery.

It would be advantageous to be able to exploit the thermal energy where it is abundantly available, especially when other energy sources are less convenient to use.

The use of thermal energy to generate electric signals may be envisaged by several methods.

Patent DE 1184828, for example, describes an example of a system for generating current from heat by exploiting the electric permittivity variations induced by temperature variations within a ferroelectric material. The ferroelectric material is arranged between two electrodes, which results in inducing a capacitance variation between these two electrodes which follows the permittivity variations of the ferroelectric material.

One of the constraints associated with this device has to do with the availability of ferroelectric materials having Curie temperatures enabling to cover a wide temperature range to provide the current generation in various conditions, and especially close to the ambient temperature.

SUMMARY

The Applicant has identified the need for a device capable of being developed for operations in various temperature ranges.

A device which exploits the deformation of one electrode with respect to the other to generate electric signals is thus provided. This deformation, which follows a cycle in the presence of a temperature gradient, depending or not on time, causes an increase in the distance between electrodes, thus enabling to vary the capacitance of a capacitor. The operating temperature range of this device then mainly depends on the mechanical properties of the deformable electrode, which enables to more finely adjust the device to adapt to environments having specific temperature variations.

According to a first embodiment, there is provided a device for converting thermal energy into electric energy intended to be used in combination with a hot source comprising:

a capacitor of variable capacitance, comprising two electrodes separated by an electrically-insulating material, one of these electrodes being deformable and being associated with an element forming a bimetallic strip, said bimetallic strip comprising at least two layers of materials having different thermal expansion coefficients, said bimetallic strip being free to deform when it is submitted to the heat of said hot source, a second capacitor having a first electrode connected to a first electrode of said capacitor of variable capacitance, a harvesting circuit electrically connected between the second electrode of the capacitor of variable capacitance and the second electrode of the second capacitor, said harvesting circuit being capable of conducting the current flowing between said second electrodes.

According to a second embodiment, there is provided a device for converting thermal energy into electric energy intended to be used in combination with a hot source comprising:

a deformable electrode associated with an element forming a bimetallic strip, comprising at least two layers of materials having different thermal expansion coefficients, said bimetallic strip being free to deform when it is submitted to the heat of said hot source, an electret, having one of its surfaces at least partially facing said deformable electrode, a second electrode comprising a layer of a conductive material, arranged in front of a surface of said electret, a harvesting circuit electrically connected between said deformable electrode and said second electrode, said harvesting circuit being capable of conducting the current flowing between said deformable electrode and said second electrode.

According to other embodiments, a device which comprises a solid support comprising a hollow cavity where the bimetallic strip is free to deform may be constructed. This support then enables the deformable element to move with an increased amplitude between two limiting positions. The shape of this hollow cavity may have any geometry, such as a parallelepipedal, cylindrical, circular, or other shape.

It may also be envisaged to provide a device according to any of the first two provided embodiments where the support is electrically insulating and supports an electrode.

In another configuration, the device may have an electrically-conductive support. In this case, it is not necessary for said support to comprise an electrode.

To increase the performance of the device according to the first two embodiments, it may be advantageous to install a device which comprises a member forming a cold source, the bimetallic strip being located between the surface of the device exposed to the hot source and said cold source. This enables increasing the temperature difference undergone by the deformable element of the device between the two limiting positions.

In practice, the bimetallic strip may comprise materials conducting the current, in which case the deformable electrode may form a layer of the bimetallic strip.

The electrode associated with the bimetallic strip may be placed on any of the bimetallic strip layers.

Thus, the deformable electrode may be in contact with the layer of the material having the largest or the smallest thermal expansion coefficient of the bimetallic strip.

To increase the available power, it is advantageous to construct an array of devices such as described hereabove, where the unit elements or the harvesting circuits are interconnected. There may be one or several unit elements per harvesting circuit.

According to an embodiment, a unit device or an array of devices may be integrated in an electronic component.

BRIEF DESCRIPTION OF THE DRAWINGS

The foregoing and other features and advantages of the embodiments will now be discussed in the following non-limiting description of a specific embodiment, in relation with the accompanying drawings.

Figure 1:
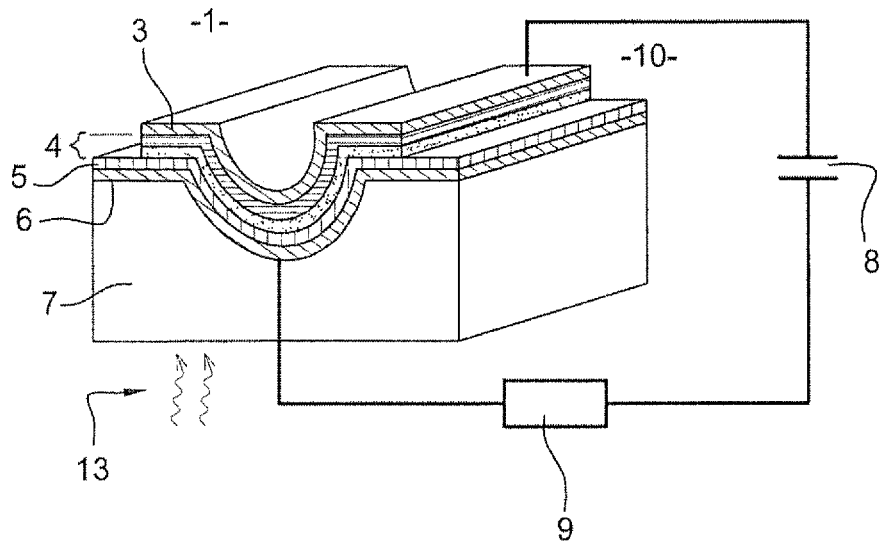
FIG. 1 is a simplified perspective view showing an electric device according to a first embodiment in a first configuration.

Of course, the shapes and the dimensions of the elements shown in the drawings have been selected to ease the understanding of the described embodiments, and may be exaggerated, or different from particular embodiments.

DETAILED DESCRIPTION

To generate electricity from a heat source 13, different embodiments have been provided, based on a similar concept associating a heat source 13 with a bimetallic strip 4, having its motion, caused by a temperature variation (which may be a gradient depending or not on time) modifying the properties of an electric circuit and generating electric signals in a closed circuit.

Device 1 illustrated in FIG. 1 comprises three elements assembled in a closed circuit:
a capacitor of variable capacitance 10, laid on a support 7
a second capacitor 8, and
a system for harvesting electric energy 9.

Figure 2:
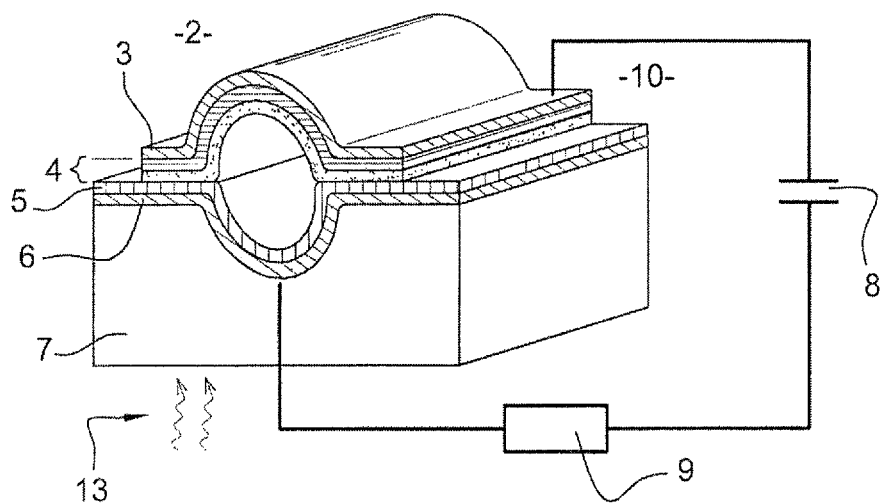
FIG. 2 is a simplified perspective view showing the electric device of FIG. 1 in a second configuration.
Figure 3:
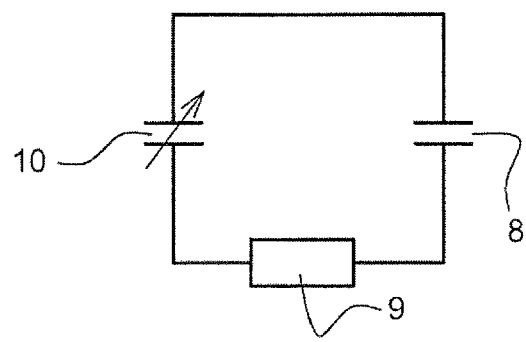
FIG. 3 is an equivalent electric diagram of the device according to the first embodiment.

The term "capacitor of variable capacitance" 10 is used to designate an assembly of two opposite electrodes, one of which deforms with respect to the other in the presence of a temperature gradient. Such a deformation draws one of the electrodes away from (see FIG. 2) or closer to (see FIG. 1) the other, thus resulting in a variation of the capacitance of capacitor 10. The temperature gradient is applied to the system by a natural or artificial hot source 13. The term "electric energy harvesting circuit" is used to designate any system enabling to convert the electric signals generated by this device into a usable form of electric energy, such as for example, a power management and conditioning circuit which enables to charge an accumulator or a battery. Known energy harvesters such as those described in reference: U.S. Pat. No. 7,781,943 B1 may, for example, be used as a starting point. It should be noted that the harvester may be connected according to several configurations, that is, in series or in parallel with the two capacitors. An equivalent electric diagram for this device is illustrated in FIG. 3.

Variable-capacitance capacitor 10 of the device shown in FIG. 1 is formed of a deformable element, comprising an electrode 3 associated with a bimetallic strip 4. Bimetallic strip 4 comprises at least two layers of materials having different thermal expansion coefficients. In addition to this deformable element, variable-capacitance capacitor 10 also comprises a counter electrode 6 separated from the deformable portion by an electrically-insulating layer 5.

The thermal expansion coefficient difference between the materials forming bimetallic strip 4 enables the latter to deform and, thereby, to move between two limiting positions (shown in FIGS. 1 and 2), when it is in the presence of a temperature gradient perpendicularly to the plane of bimetallic strip 4. Generally, it is sufficient for the bimetallic strip to be in the presence of a temperature gradient having a non-zero component along an axis perpendicular to the bimetallic strip and sufficient to induce deformations of said bimetallic strip 4.

Insulating layer 5 enables to do away with any risk of short-circuit between the electrodes of variable-capacitance capacitor 10 in the case where the materials forming bimetallic strip 4 are themselves electrically conductive. On the other hand, insulating layer 5 also enables to select the maximum value of the variable capacitance of capacitor 10.

In the device of FIG. 1, bimetallic strip 4 is in contact with a layer of electrically insulating material 5. Insulating material layer 5 may be formed of support 7 supporting counter electrode 6, or may be made of another material, for example, any polymer. It is, however, desirable to ascertain that this material has dimensions enabling it to withstand the mechanical stress undergone due to the displacements of bimetallic strip 4, which may come into contact with said electric insulator 5 during its mechanical oscillations. The appreciation of the thickness of this layer especially depends on the applications and on the selection of the different materials and geometries of the device. This appreciation is within the abilities of those skilled in the art.

Device 1 of FIG. 1 comprises a second capacitor 8, series-connected with variable-capacitance capacitor 10. Capacitor 8 is in practice used in charge reservoirs, and should thus be charged so that the device generates electric pulses in the presence of a hot source 13. A prior charge of capacitor 8 will be provided for this purpose.

Appended to variable-capacitance capacitor 10 such as shown in FIG. 1 is a support 7 which may be electrically insulating or electrically conductive. This support has a hollow cavity enabling the deformable element of variable-capacitance capacitor 10 to move with an optimized amplitude.

Support 7 may be made of an electrically-conductive material, in which case it may also be used as a counter electrode 6. When the device is associated with other similar devices sharing the same support, it may be desirable for support 7 to be designed in an electrically-insulating material, to avoid cross couplings between the different devices. It is further preferable to have a support 7 made of a material which efficiently conducts the heat from hot source 13 to bimetallic strip 4. Advantageously, materials having a lateral deformation under a thermal stress which is comparable to that of bimetallic strip 4 to manufacture support 7 will also be preferred, which enables decreasing the mechanical stress imposed to the device.

The conversion of thermal energy into electric energy in the form of electric pulses is obtained due to the deformable element of the variable-capacitance capacitor 10.

An advantageous selection of materials for bimetallic strip 4 belonging to variable-capacitance capacitor 10 may be an iron/nickel alloy with approximately 36% of iron (also commonly called "Invar®", with one of the lowest thermal expansion coefficients known to date) for the material closest to hot source 13, and aluminum for the material most distant from hot source 13. Aluminum is known to have a thermal expansion coefficient approximately 20 times larger than that of "Invar®", on the order of from $22\times10^{-6}$ K$^{-1}$.

The specific selection of these materials may be a function of the temperature differences sensed by bimetallic strip 4 between its two limiting positions, and of the possible mechanical stress due to the size of the device. Indeed, the deformations of bimetallic strip 4 and its mechanical interaction with insulator 5 with which it comes into contact may have an influence on the system lifetime. In a macroscopic configuration where bimetallic strip 4 has, as typical characteristic dimensions, a width and a length of few centimeters and a thickness of a few tens of millimeters, a bimetallic strip 4 formed of aluminum and of "Invar®" may be appropriate. In a microscopic configuration, where bimetallic strip 4 has, as typical characteristic dimensions, a width and a length of a few millimeters and a thickness of a few tens of microns, a silicon/aluminum couple (where silicon replaces "Invar®"), or Ti/Cu, or Ti/Al, may be naturally preferred.

Figure 4:
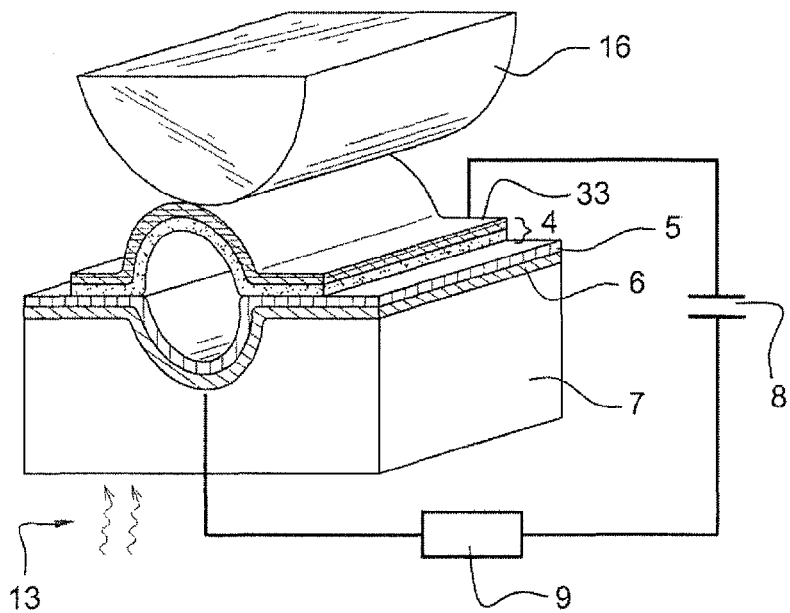
FIG. 4 is a simplified perspective view showing an electric device according to a second embodiment where the deformable electrode is a layer of the bimetallic strip and the bimetallic strip comes into contact with a member forming a cold source.
Figure 5:
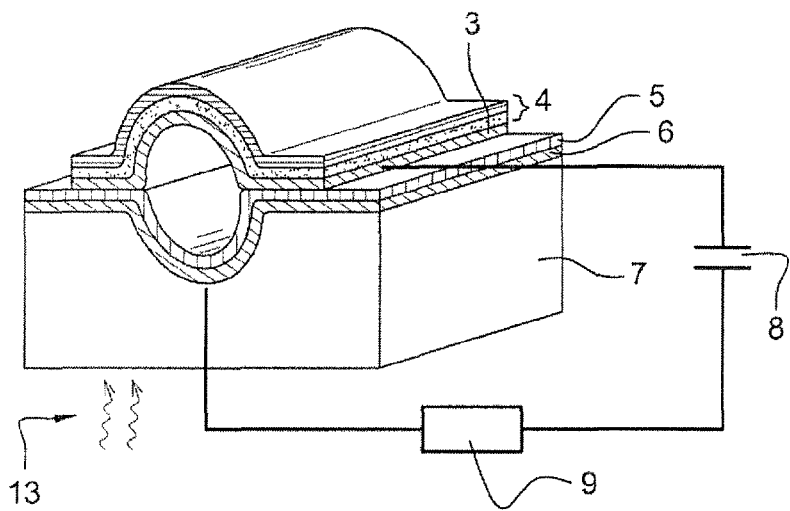
FIG. 5 is a simplified perspective view similar to that of FIG. 1 showing an electric device according to a third embodiment where the deformable electrode associated with the bimetallic strip is in contact with the material of the bimetallic strip having the smallest thermal expansion coefficient.

Moreover, other materials may perfectly be used, provided for them to have different thermal expansion coefficients and for the latter to be capable of inducing a deformation of bimetallic strip 4 in the temperature gradient where it is intended to be placed. A system where one of the materials forming bimetallic strip 4 is an electric conductor, then capable of being used as electrode 3, as shown in FIG. 4, may for example be provided. It is also possible for the materials forming bimetallic strip 4 to all be electric insulators, in which case a conductive electrode 3 is fixed to the bimetallic strip, on top (see FIGS. 1, 2, 6, 7, 8) or at the bottom (see FIG. 5) of the bimetallic strip. As non-limiting examples, the bimetallic strip materials may be selected from among: aluminum (Al), titanium (Ti), titanium nitride (TiN), polycrystalline titanium, copper (Cu), tungsten (W), silicon dioxide (SiO$_2$), iron nickel alloy.

Figure 6:
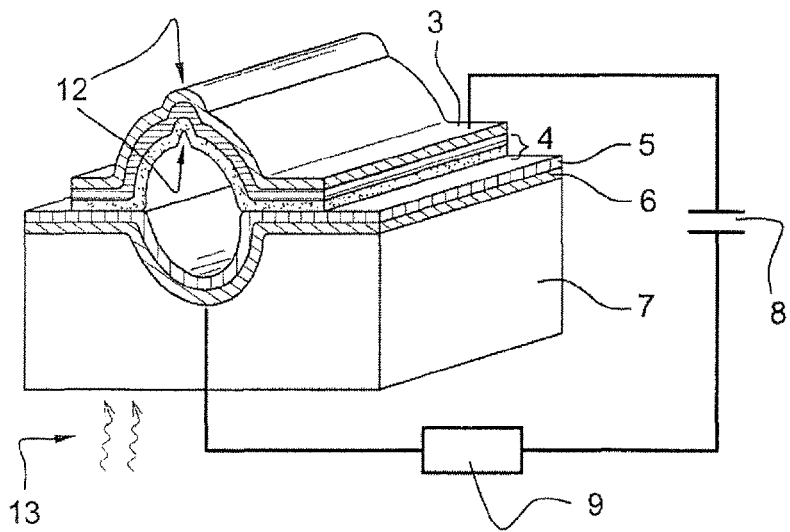
FIG. 6 is a simplified perspective view showing a variation of the electric device of FIG. 2, where the deformable electrode associated with the bimetallic strip is punched.

To guarantee an abrupt deformation of bimetallic strip 4 between its two limiting positions, bimetallic strips which have been geometrically shaped for this purpose, for example, by a punching 12 of said bimetallic strip 4, as shown in FIG. 6, may be used. Such a punching 12, which pre-stresses bimetallic strip 4, may also be used to modulate the temperature differences to which bimetallic strip 4 is sensitive. Thus, the larger the punch 12, the higher the temperature difference necessary to have oscillations between the two limiting positions of bimetallic strip 4 may be. It should however be noted that the oscillation speed of bimetallic strip 4 may not be an essential criterion of the device operation. More specifically, when the bimetallic strip 4 is given a specific shape, the transition of the bimetallic strip 4 between its two limiting positions is more sudden. The amount of exchanged thermal energy necessary to overcome the mechanical internal forces is more important. Thus, the device has a bistable behavior, which means that the bimetallic strip 4 oscillates between two positions where it is in a stable mechanical state. Such a sudden transition is advantageous because the current and/or voltage levels of the generated electrical signals are substantially higher than a softer transition. The electrical conversion is consequently more efficient.

Moreover, when the bimetallic strip 4 is in a stable mechanical state, it can exert a more important contact force on the cold and/or heat sources. The thermal transfer is improved when it occurs between two surfaces with increased contact surface and a substantial contact force.

Incidentally, in addition to a hot source 13, it is possible to place a cold member 16, so that the bimetallic strip is interposed between these two heat sources, thus defining a larger transverse temperature gradient in the medium where the device is placed. For the deformable element of the variable-capacitance capacitor to more rapidly pass from one limiting position to the other, it may be advantageous to place cold member 16 so that the deformable element comes into contact with cold element 16 in one of its limiting positions (see FIG. 4).

In this case, it may also be provided to mount the element supporting bimetallic strip 4 with a sensor to measure its displacements, advantageously, a piezoelectric sensor.

Various geometries may be envisaged for the above-described electric device. For example, a deformable parallelepipedal element maintained by two edges to an assembly formed by insulator 5, electrode 6, and support 7 may be designed, this assembly being itself parallelepipedal (as shown in FIGS. 1, 2, 4, 5, 6, 7, 8). Other shapes may be compatible with an operation of the device, according to this use, be it provided to operate alone, in an array of devices (as shown in FIG. 9), or within an electronic component. It is also possible to only maintain the deformable element from a single side or all along its circumference.

Figure 7:
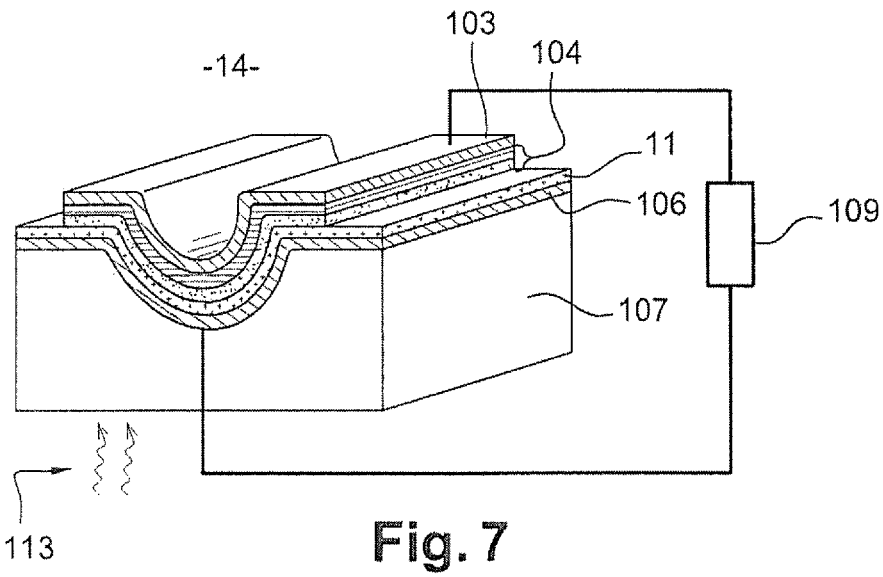
FIG. 7 is a simplified perspective view showing an electric device according to a fourth embodiment in a first configuration.
Figure 8:
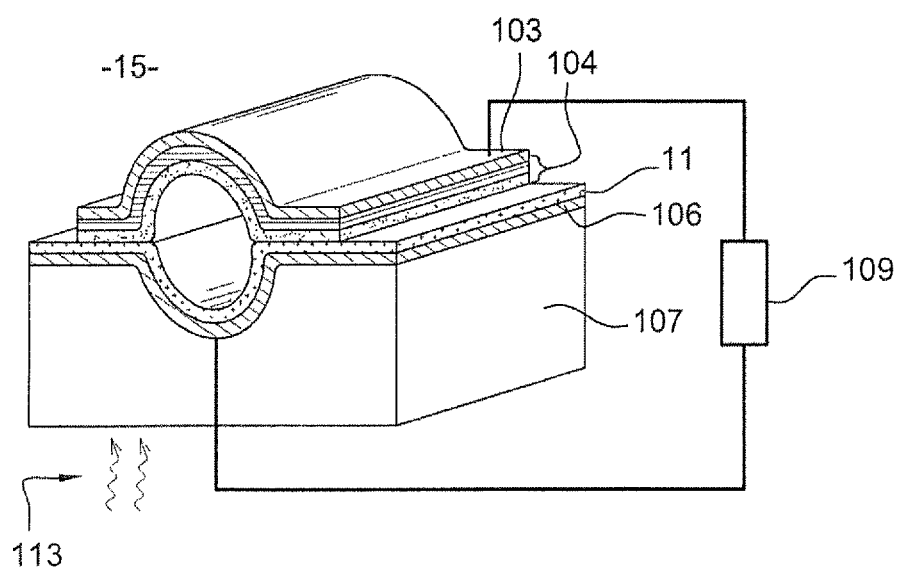
FIG. 8 is a simplified perspective view showing the electric device of FIG. 7 in a second configuration.
Figure 9:
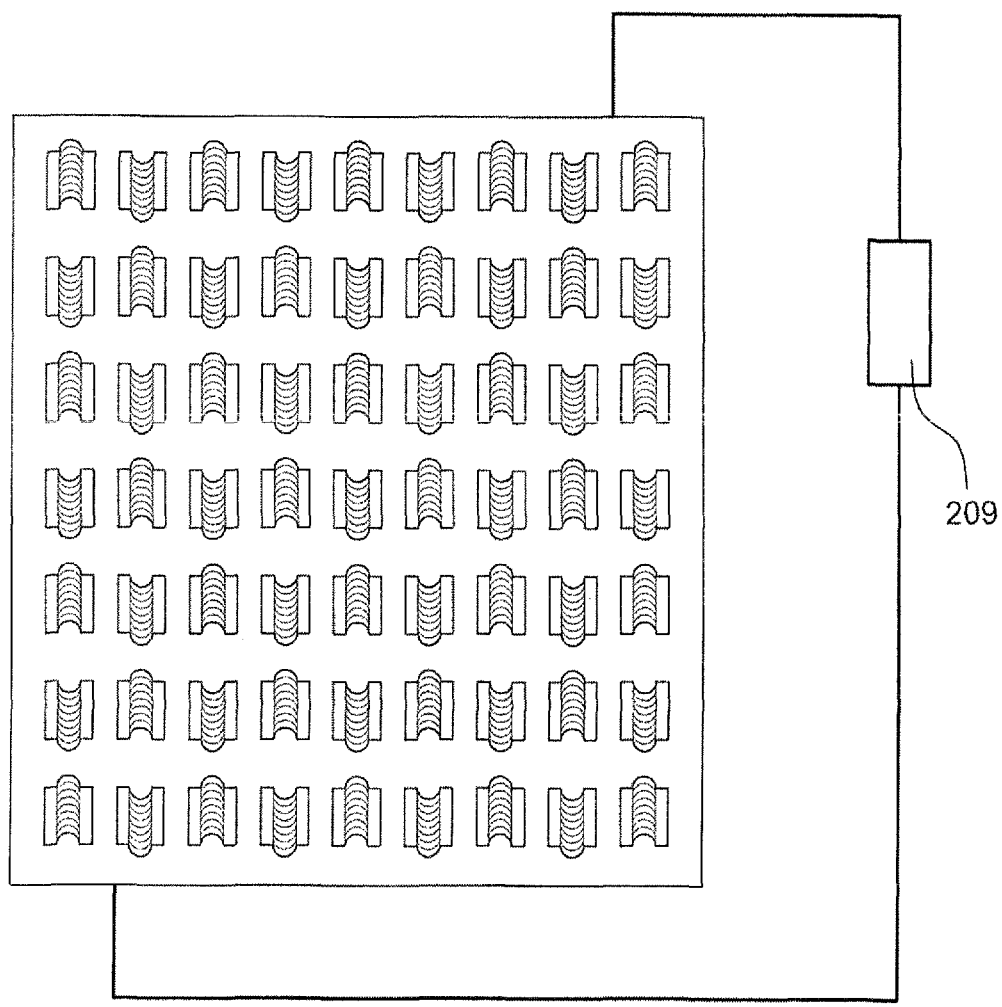
FIG. 9 is a simplified view of an assembly of interconnected electric energy generation devices.

An alternative embodiment is provided by device 14 of FIG. 7, also shown in the form of device 15 of FIG. 8. This device comprises four main elements:

a deformable element comprising a bimetallic strip 104 and an electrode 103, where the latter may be one of the layers of the actual bimetallic strip 104 an electret 11, used as a charge reservoir or as a biased source a second electrode 106 laid on a support 107 and a circuit 109 for harvesting the current generated by the device This device has similarities with the previously-described device. In particular, bimetallic strip 104, support 107, and harvester 109 substantially fulfill the same function, the main difference being the use of an electret 11.

Electret 11 is an insulating layer having a typical thickness on the order of a few tens of microns in a macroscopic configuration or a typical thickness on the order of one micron or less in a microscopic configuration. The characteristic widths and lengths of the electret are substantially the same as those used for bimetallic strip 4, such as described hereabove.

Electret 11 is a polymer (or ceramic, for example, SiO$_2$) layer which is used as a space or surface charge reservoir. It may also be made of an internally-biased material (ferroelectric ceramic, for example), in which case it will have a potential difference between its two faces. It is fixed to support 107, so that the motions of the deformable element with respect to electret 11 cause a variation of the capacitance between the electrode of the deformable element and electret 11. In that sense, the deformable element and electret 11 form a capacitive element which behaves similarly to variable-capacitance capacitor 10 described in device 1 of FIGS. 1 to 3. A thin electret 11 provides greater capacitance variations than a thick electret 11, which provides a better mechanical resistance and enables to have a larger charge reservoir.

When charged to voltages capable of reaching several hundreds of volts in a macroscopic configuration of the device, electret 11 discharges over long time scales, capable of reaching several years, which makes it useful as compared with a conventional capacitor which has to be recharged to compensate for losses due to leakage resistances. According to the technology used, the charge storage life in the electret may be variable and the electret will thus be selected according to the desired useful life of the device. Electret 11 may be of two types: with an internal biasing or a space charge, and it acquires the charge or the biasing which is applied thereto at the time of its manufacturing. An example of a material that may be used to manufacture an electret is silicon oxynitride (SiON).

The size of the above-described devices may advantageously be decreased to ease their integration in electronic components as well as to benefit from a better electromechanical efficiency.

The above-described devices are advantageous, for example, for an application in the field of self-contained sensors, located in places with a low luminosity and close to which a heat source provides an exploitable temperature gradient. One of these two devices may thus be used close to such a hot source to power low-consumption electronic components without having to use batteries.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device for converting thermal energy into electric energy intended to be used in combination with a hot source comprising:
    a capacitor of variable capacitance, comprising two electrodes separated by an electrically-insulating material, one of these electrodes being deformable and being associated with an element forming a bimetallic strip, said bimetallic strip comprising at least two layers of materials having different thermal expansion coefficients, said bimetallic strip being free to deform when it is submitted to the heat of said hot source;
    a second capacitor having a first electrode connected to a first electrode of said capacitor of variable capacitance,
    a harvesting circuit electrically connected between the second electrode of the capacitor of variable capacitance and the second electrode of the second capacitor (8), said harvesting circuit being capable of conducting the current flowing between said second electrodes.

2. A device for converting thermal energy into electric energy intended to be used in combination with a hot source comprising:
    a deformable electrode associated with an element forming a bimetallic strip, comprising at least two layers of materials having different thermal expansion coefficients, said bimetallic strip being free to deform when it is submitted to the heat of said hot source;
    an electret, having one of its surfaces at least partially facing said deformable electrode;
    a second electrode comprising a layer of a conductive material, arranged in front of a surface of said electret;
    a harvesting circuit electrically connected between said deformable electrode and said second electrode, said harvesting circuit being capable of conducting the current flowing between said deformable electrode and said second electrode.

3. The device of claim 1, comprising a solid support comprising a hollow cavity where the bimetallic strip is free to deform.

4. The device of claim 3, wherein the support is electrically insulating and support an electrode.

5. The device of claim 3, wherein the support is electrically conductive.

6. The device of claim 1, comprising a member forming a cold source, the bimetallic strip being located between the surface of the device exposed to the hot source and said cold source.

7. The device of claim 6, wherein the bimetallic strip has a deformed position where it is in contact with the member forming said cold source.

8. The device of claim 1, wherein the deformable electrode forms a layer of the bimetallic strip.

9. The device of claim 1, wherein the deformable electrode is in contact with the layer of the material having the largest thermal expansion coefficient of the bimetallic strip.

10. The device of claim 1, wherein the deformable electrode is in contact with the layer of the material having the smallest thermal expansion coefficient of the bimetallic strip.

11. An array of devices according to claim 1, wherein the harvesting circuits are interconnected.

12. The device of claim 2, comprising a solid support comprising a hollow cavity where the bimetallic strip is free to deform.

13. The device of claim 2, wherein the support is electrically insulating and support an electrode.

14. The device of claim 2, wherein the support is electrically conductive.

15. The device of claim 2, comprising a member forming a cold source, the bimetallic strip being located between the surface of the device exposed to the hot source and said cold source.

16. The device of claim 2, wherein the bimetallic strip has a deformed position where it is in contact with the member forming said cold source.

17. The device of claim 2, wherein the deformable electrode forms a layer of the bimetallic strip.

18. The device of claim 2, wherein the deformable electrode is in contact with the layer of the material having the largest thermal expansion coefficient of the bimetallic strip.

19. The device of claim 2, wherein the deformable electrode is in contact with the layer of the material having the smallest thermal expansion coefficient of the bimetallic strip.

20. An array of devices according to claim 2, wherein the harvesting circuits are interconnected.

21. The device of claim 1 wherein the bimetallic strip is geometrically shaped to obtain an abrupt deformation between two limiting positions.

22. The device of claim 2 wherein the bimetallic strip is geometrically shaped to obtain an abrupt deformation between two limiting positions.

* * * * *